(12) United States Patent
Ratnakar

(10) Patent No.: US 6,256,415 B1
(45) Date of Patent: Jul. 3, 2001

(54) TWO ROW BUFFER IMAGE COMPRESSION (TROBIC)

(75) Inventor: Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/095,806

(22) Filed: Jun. 10, 1998

(51) Int. Cl.$^7$ .................................................. G06K 9/36
(52) U.S. Cl. ..................... 382/232; 382/233; 382/244; 382/248; 382/253; 382/166
(58) Field of Search .................................... 382/166, 173, 382/176, 232, 233, 240, 244, 245, 246, 248, 253

(56) References Cited

U.S. PATENT DOCUMENTS

| 5,359,676 | 10/1994 | Fan . |
| 5,379,122 | 1/1995 | Eschbach . |
| 5,674,012 | 10/1997 | Sasaki . |
| 5,696,842 | 12/1997 | Shirasawa et al. . |
| 5,892,847 | * 4/1999 | Johnson ............................... 382/232 |

OTHER PUBLICATIONS

DeVore, et al. "*Image Compression Through Wavelet Transform Coding*", IEEE Transactions On Information Theory, vol. 38, No. 2, pp. 719–746 Mar. 1992.

Said, et al. "*A New, Fast, And Efficient Image Codec Based On Set Partitioning In Hierarchical Trees*", IEEE Transactions On Circuits And Systems For Video Technology, vol. 6, No. 3, pp. 243–250, Jun. 1996.

Shapiro, J.M. "*Embedded Image Coding Using Zerotress Of Wavelet Coefficients*", IEEE Transactions On Signal Processing, vol. 41, No. 12, pp. 3445–3462, Dec. 1993.

Villasenor, et al. "*Wavelet Filter Evaluation For Image Compression*", IEEE Transactions On Image Processing, 2: 1053–1060, Aug. 1995.

* cited by examiner

Primary Examiner—Phuoc Tran

(57) ABSTRACT

A Two Row Buffer Image Compression (TROBIC) technique is provided that operates on 32×2 blocks of pixels and uses a block-based coding scheme to provide alternative coding modes for image blocks containing different types of image data. The TROBIC algorithm automatically evaluates the image presented to determine regions containing text, graphics, synthetic images and natural images along with determining the most effective combination of global-index coding, local-index coding, lossless coding and wavelet coding to use to guarantee the desired compression ratio and high quality. The wavelet coding technique, in addition to being part of TROBIC, may be used independently in a wide variety of compression applications. The wavelet coding technique is carried out by a simple block codec with wavelets (SBCW) that uses wavelet filters to transform 32×2 image blocks into subband coefficients organized in a tree structure. These coefficients are then encoded using a novel entropy coding technique with precise rate control.

9 Claims, 8 Drawing Sheets

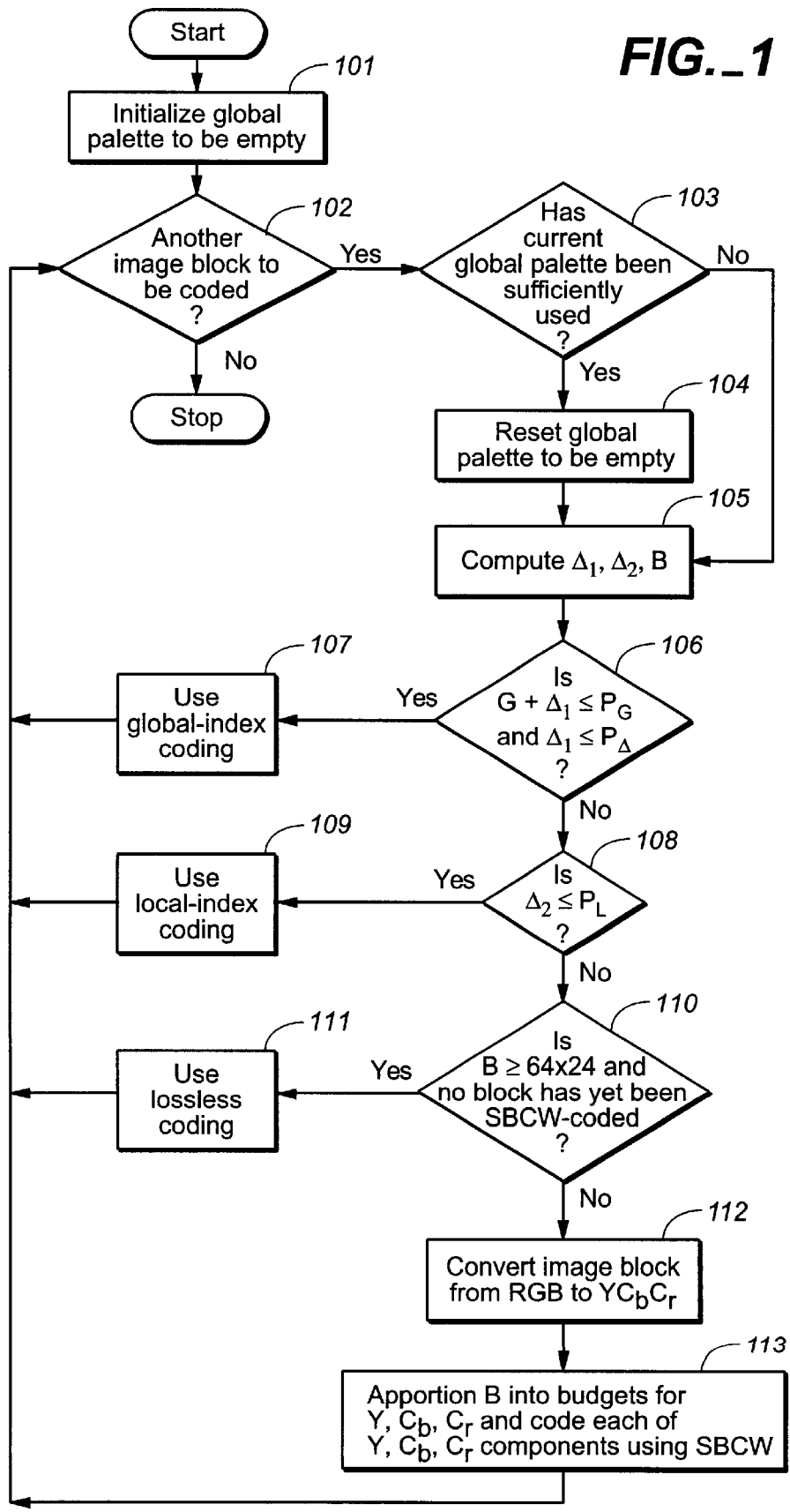
FIG._1

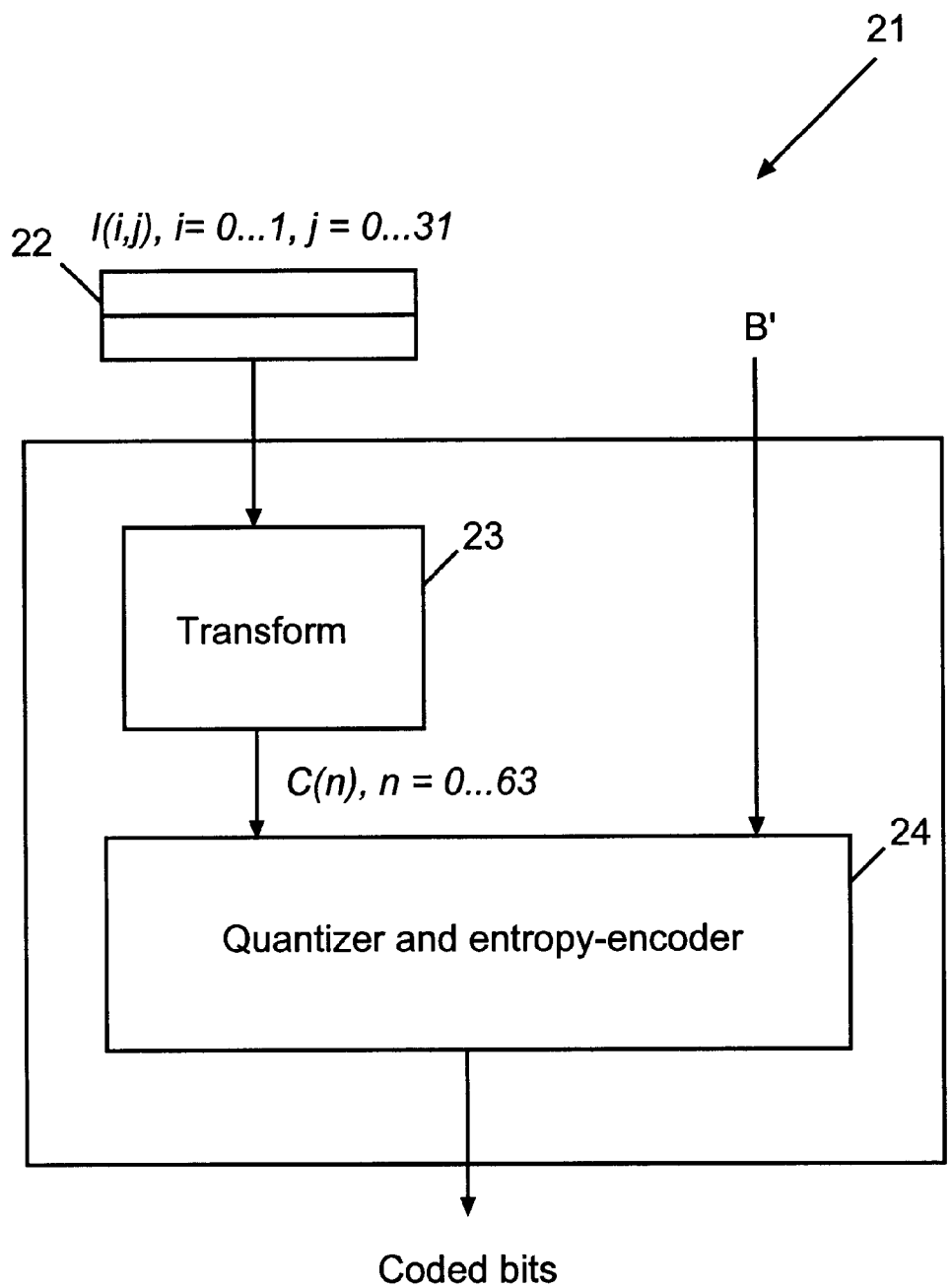
FIG._2

$$x_0 x_1 \cdots \qquad \cdots x_{2M-1}$$
$$\downarrow$$
$$y_0 y_1 \cdots y_{M-1} \; z_0 z_1 \cdots z_{M-1}$$
FIG._3
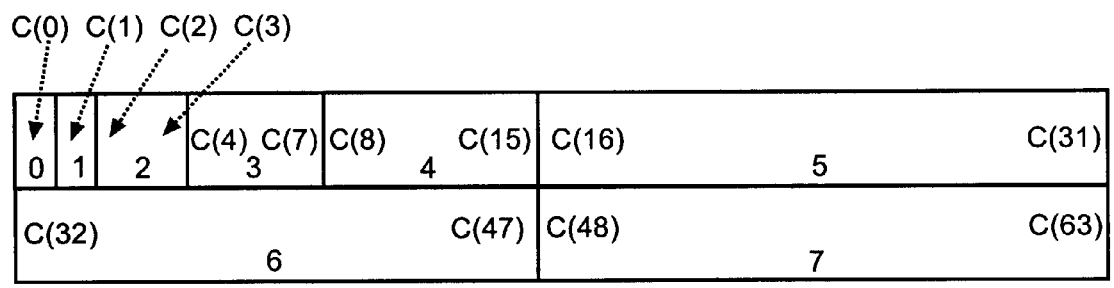
FIG._4

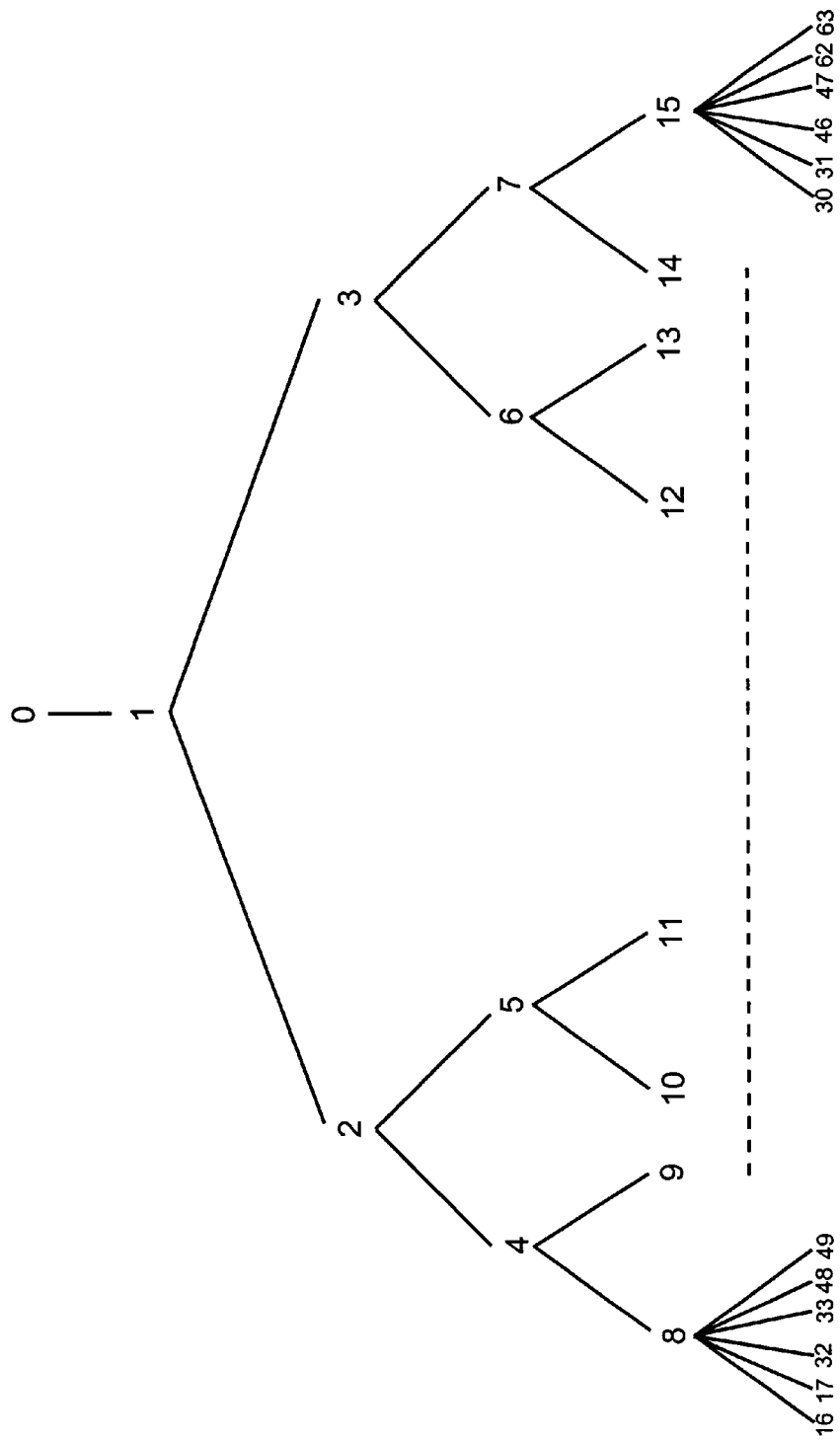
FIG._5

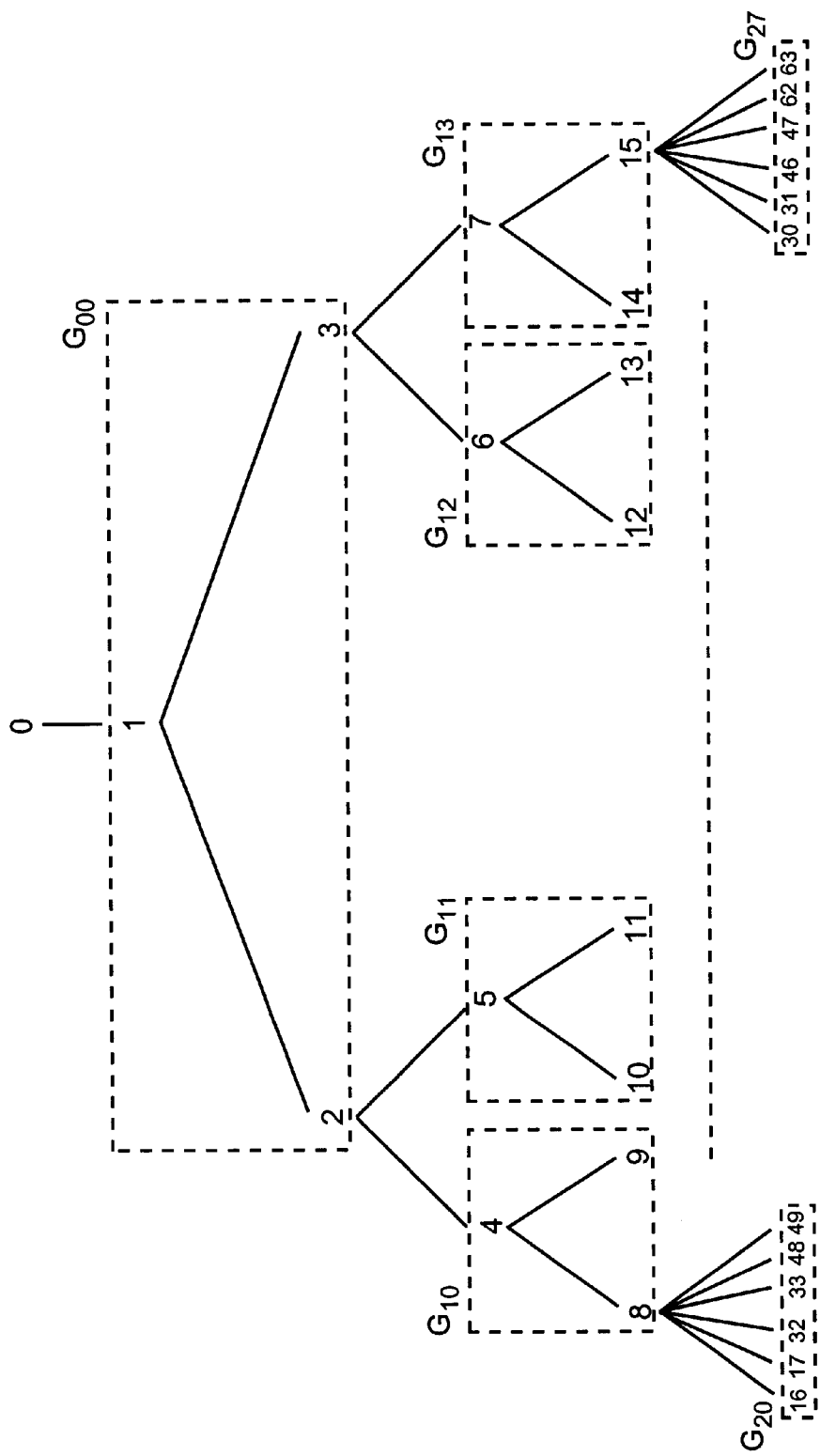
FIG._6

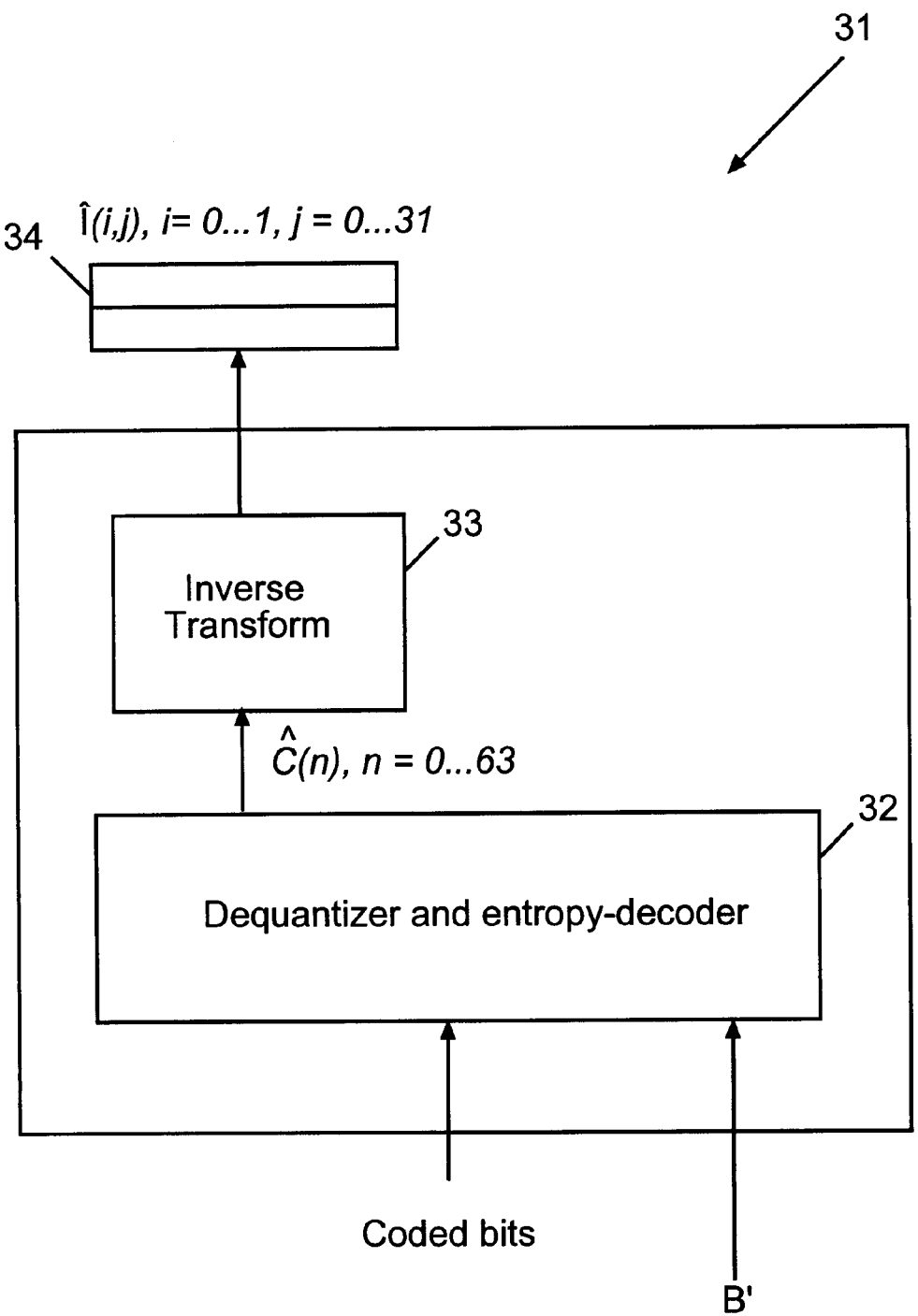
FIG._7

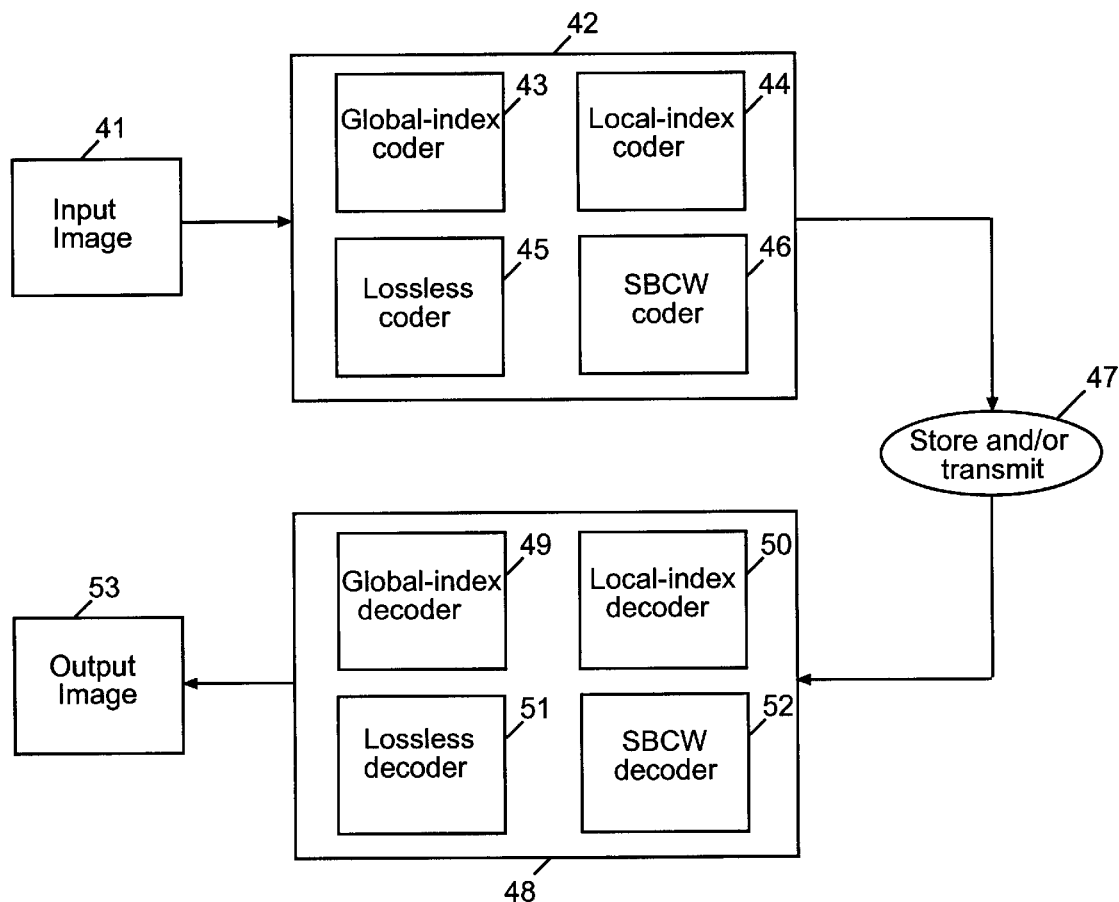
FIG._8

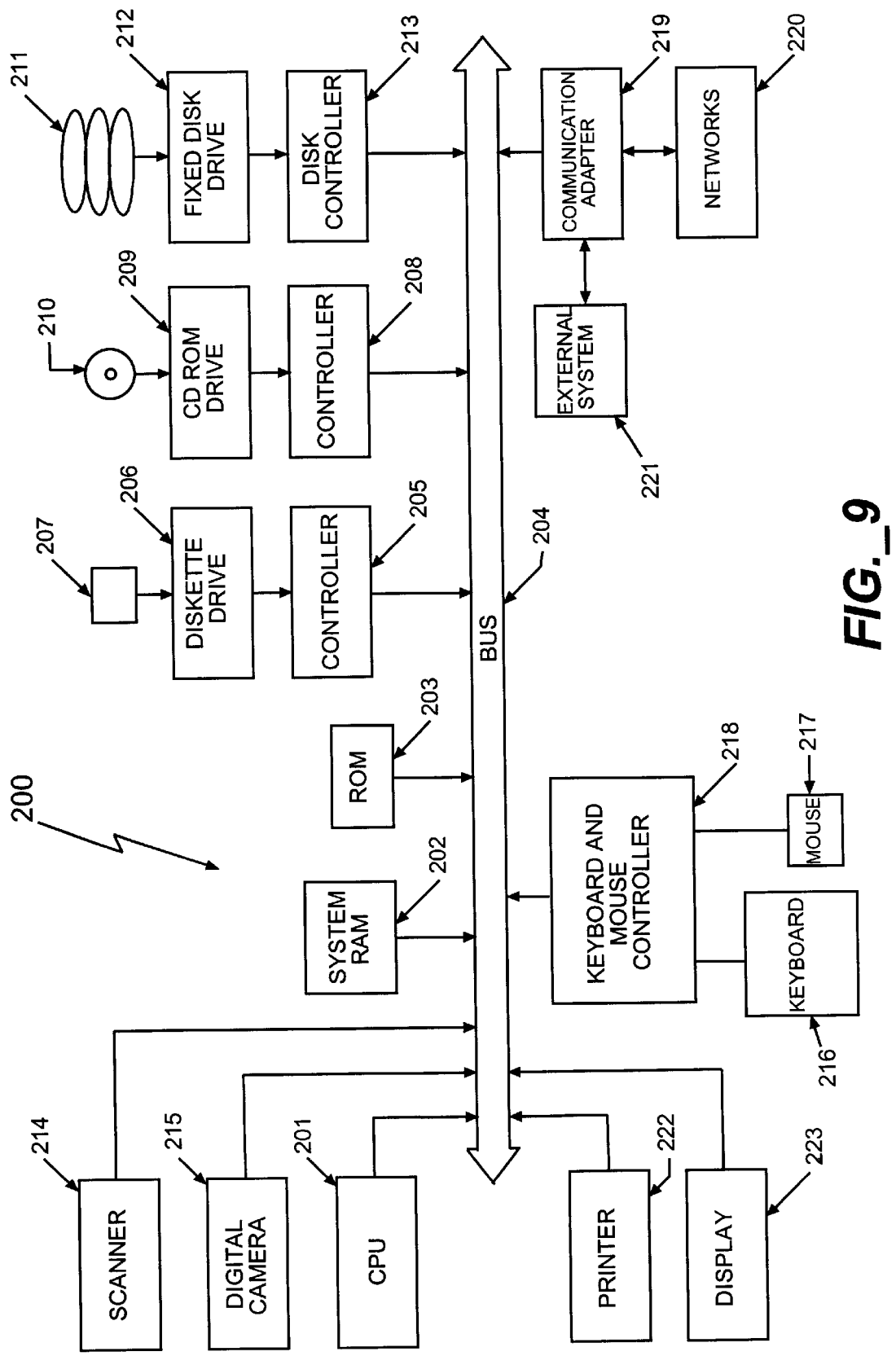
FIG._9

TWO ROW BUFFER IMAGE COMPRESSION (TROBIC)

BACKGROUND OF THE INVENTION

1. Field of the Invention

This invention relates generally to an image compression technique, and more particularly to an image compression technique that operates on blocks of pixels using a block-based coding scheme that codes different types of image data in different ways based on parameters that are determined by the coding process itself. Still more particularly, the image compression technique of the present invention evaluates the image to be compressed to determine its make-up and uses this information to determine the most effective combination of coding techniques to use to guarantee a desired compression ratio.

2. Description of the Related Art

A typical high quality digitized color image may use 24 bits per pixel (bpp)—8 bits for each of the three basic color components: red (R), green (G) and blue (B) in RGB color space or for each of the three basic luminance-chrominance components: luminance (Y), chrominance ($C_b$) and chrominance ($C_r$) in $YC_bC_r$ color space. In the uncompressed state (i.e., in the spatial or pixel domain), such images are simply too costly and time consuming to transmit and store. The high transmission time and memory requirements for high quality color images is apparent when compared to gray-scale images that may use 8 bpp or bi-level images that use only 1 bpp. Thus, applications and devices which store or transmit high quality digitized color images typically do so in a compressed format, using one of the currently available compression techniques.

Various image compression techniques have been proposed to reduce the number of bits used to represent a digitized color image while, at the same time, providing quality image representation. These techniques generally seek to strike a balance between transmission time and memory requirements on the one hand and image quality on the other. Some of these techniques are "lossless," meaning that they preserve all information of the original image so that it is reproduced exactly when the data is decompressed. Other techniques, commonly referred to as "lossy," discard information which is visually insignificant. By only approximating the original image (rather than reproducing it exactly), lossy techniques are generally able to produce higher compression ratios than lossless techniques. In selecting the appropriate compression technique among those currently available, the user must consider the particular image to be compressed, the desired compression ratio and image quality as well as transmission time and memory requirements, with the understanding that higher compression ratios lead to lower transmission times and memory requirements but also produce lower quality images.

One of the problems with the currently available image compression techniques is that most tend to be designed for one type of data and generally do not work well on hybrid color images (that is, images containing text, graphics, as well as synthetic and natural images). Since different types of data have different frequency characteristics, it is difficult to achieve a high compression ratio by applying a single coding mode to a hybrid image without sacrificing image quality. In order to effectively compress hybrid images an adaptive coding technique is needed.

One such adaptive coding technique is proposed in U.S. Pat. No. 5,696,842 which provides a coding process that separates a document image into blocks and classifies them as "picture" blocks or "black-and-white" blocks using a block classification algorithm that employs a complex edge-detection mechanism. The blocks are then coded according to their classification. Arithmetic coding is used for "black-and-white" blocks and ADCT for "picture" blocks. While this coding system offers certain advantages over non-adaptive coding systems, it has certain disadvantages as well. For example, the block classification scheme is relatively complex and is not tied to the coding process itself, which makes for a relatively high overhead requirement. In addition, the adaptive coding technique of this patent does not offer guaranteed compression rate control.

OBJECTS OF THE INVENTION

Therefore, it is an object of the present invention to overcome the aforementioned problems.

It is another object of this invention to provide an image compression technique designed for high quality compression of hybrid color images.

It is a further object of this invention to provide an image compression technique that has low computational complexity, employs only two rows of buffer on both the compression and decompression side, and uses a block-based coding scheme to provide alternative coding techniques for different types of image blocks at a guaranteed compression rate.

It is yet another object of the present invention to provide an image compression technique using a block-based coding scheme that ties block classification to the coding process itself.

It is still another object of this invention to provide an image compression technique that uses palette (both global and local), lossless and wavelet transform coding techniques to provide guaranteed compression rate-control.

It is still a further object of the present invention to provide a wavelet transform coding technique for 32×2 image blocks that is targeted for high-quality compression, has low computation complexity and offers exact rate control.

SUMMARY OF THE INVENTION

One aspect of the invention is embodied in a method of compressing a digitized image, having different types of image data, such as text, graphics, synthetic image data and natural image data. The image is segmented into a plurality of 32×2 blocks of pixel data, wherein each image block is classified as being a natural block or a non-natural block. One of global-index coding, local-index coding, lossless coding or wavelet coding is selected to code each image block based on whether or not various coding conditions are satisfied. The coded data is output as a compressed bit stream.

The method may be carried out using an encoder/decoder system. In such a system an encoder, having a global-index coder, a local-index coder, a lossless coder and a wavelet coder, compresses the digitized image and generates the compressed bit stream. A decoder, which includes a global-index decoder, a local-index decoder, a lossless decoder and a wavelet decoder, is provided to reverse the steps of the encoder by regenerating the blocks of pixel data from the compressed bit stream. The encoder and decoder may be configured separately to respectively compress or decompress a digitized image in accordance with the invention.

The method may also be carried out using an article of manufacture which may be a computer, a computer peripheral device, a computer component such as a memory or processor, or a storage device such as a diskette or CD ROM. The article of manufacture has software or hardware embodied therein for compressing/decompressing the digitized image in accordance with the invention.

In another aspect of the invention, a digitized image is compressed and/or decompressed using a wavelet technique The underlying method of this technique comprises segmenting the image into a plurality of 32×2 blocks of pixel data, transforming each of these blocks of data into a corresponding block of subband coefficients, quantizing the subband coefficients; and coding the quantized subband coefficients. The transforming step comprises filtering each block of data using a 2-6 wavelet filter and a Haar filter for subband decomposition. The Haar filter is applied to each of the columns of data in each block and the 2-6 wavelet filter is applied to each of the rows of data in each block. The 2-6 wavelet filter is then repeatedly applied to the top row of data in each block to obtain a low pass coefficient for each block. The quantizing step comprises organizing the filtered subband coefficients together into 11 different groups using a tree structure in which each level of the tree corresponds to a particular level of resolution. The coding step comprises coding each of the different groups of subband coefficients using the same number of bits per coefficient, that number being determined so that the total number of bits used for a block is no more than a given budget.

The wavelet method may be carried out using an encoder/decoder system such as a simple block codec with wavelets (SBCW). In such a system an encoder comprises means for transforming each of a plurality of blocks of pixel data into a corresponding block of subband coefficients, a quantizer for quantizing the subband coefficients, and an entropy-encoder for coding the quantized subband coefficients to generate a bit stream of coded data representing the compressed image. A decoder, which includes an entropy decoder, a dequantizer and inverse transforming means, reverses the steps of the encoder by reconstructing blocks of pixel data from the compressed bit stream. The encoder and decoder may be configured separately to respectively compress or decompress a digitized image in accordance with this aspect of the invention.

The SBCW method may also be carried out using an article of manufacture which may be a computer, a computer peripheral device, a computer component such as a memory or processor, or a storage device such as a diskette or CD ROM. The article of manufacture has software or hardware embodied therein for compressing/decompressing the digitized image in accordance with this aspect of the invention.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a flow chart illustrating the two row buffer image compression (TROBIC) process.

FIG. 2 is a block diagram of an encoder, which may be part of a simple block codec with wavelets (SBCW), illustrating the two steps of the block encoding process: transformation and entropy-coding.

FIG. 3 shows the operation of the analysis filter of SBCW which maps a sequence $\{x_i\}$ of length 2M into M low-pass coefficients ($\{y_i\}$) and M high-pass coefficients ($\{z_i\}$).

FIG. 4 shows the subbands in a block of 64 coefficients in connection with SBCW.

FIG. 5 shows the tree structure of the subband coefficients in connection with SBCW.

FIG. 6 illustrates groups of coefficients in connection with SBCW.

FIG. 7 is a block diagram of a decoder which forms part of SBCW.

FIG. 8 is block diagram showing a coding/decoding system for TROBIC.

FIG. 9 shows a computer system for use with TROBIC.

DESCRIPTION OF THE PREFERRED EMBODIMENTS

The TROBIC technique (hereinafter simply TROBIC) operates on 32×2 blocks of pixels and uses a block-based coding scheme to provide alternative coding modes for image blocks containing different types of image data. The TROBIC algorithm automatically classifies each block as being either a non-natural block (consisting of text, graphics, line drawings) or a natural block (consisting of smoothly varying pixel intensities). This classification determines the most effective combination of coding techniques to use to produce a high quality image and to guarantee the desired compression ratio. TROBIC is particularly useful for efficiently transmitting hybrid color images from a computer to a printer.

There are four different coding techniques used in TROBIC: global-index coding, local-index coding, lossless coding and a coding process which uses a simple block codec with wavelets (SBCW). Global- and local-index coding are both lossless, palette coding modes. Global-index coding uses a single palette over a large number of image blocks, whereas local-index coding uses a small palette specific to a single image block. If a block cannot be coded using global- or local-index coding, then that block is classified as a natural image block. The lossless coding technique itself is used to compress natural image blocks only when the compression has been very efficient up to that point. Otherwise, the SBCW coding process, which is a lossy image compression technique, is used on natural blocks.

The coding procedure is described below with reference to FIG. 1. At the outset, the coding algorithm initializes the global palette to be empty, and G, the size of the global palette, to zero, in step 101. If it is determined in step 102 that there is another image block to be coded, then the algorithm proceeds to step 103, where it is determined if the current global palette has been sufficiently used. This test can, for example, be implemented by counting the number of blocks up to that point which were global-index coded using the current global palette, and then comparing this number with a suitably large threshold. If the test succeeds, then the global palette is reset to be empty and its size, G, set to zero in step 104 whence the algorithm proceeds to step 105. If the test in step 103 fails then the algorithm proceeds directly to step 105. In step 105, $\Delta_1$, $\Delta_2$, B are computed for the current block, $\Delta_1$ being the number of colors (a single color being a triple of R,G,B values) that will have to be added to the global palette so that it will contain all the colors in the current block. The value $\Delta_2$ is the total number of colors in the current block, and B is the bit budget for the current block. In step 106, it is determined whether the current block can be global-index coded by performing a test. Specifically, global-index coding is used if:

$G+\Delta_1 \leq P_G$ and $\Delta_1 \leq P_\Delta$ where G is the current number of colors in the global-index palette, $\Delta_1$ is the number of new colors needed for the current block, and $P_G$ and $P_A$ are design parameters. If B is the block bit budget calculated in step 105, then $P_G$ is related to B as:

$$64\lceil \log_2 P_G \rceil \leq B.$$

When the overall budget is for 3:1 compression (which is the typical compression rate that TROBIC is designed for), we can set $P_G=256$ and $P_A=15$, meaning that the global-index palette has 256 colors and no block is permitted to add more than 15 colors to that palette.

If the conditions in step 106 for global-index coding are satisfied, then the algorithm proceeds to step 107 where the current block is coded using global-index coding. Otherwise, a second condition is evaluated in step 108 to determine whether local-index coding is to be used. Local-index coding is used if:

$$\Delta_2 \leq P_L$$

where $\Delta_2$ is the size of the local-index palette (number of distinct colors in the block, determined in step 105) and $P_L$ determines the maximum size of the local-index palette. $P_L$ is related to B by the following equation:

$$65\lceil \log_2 P_L \rceil + 24 P_L \leq B$$

For the typical 3:1 compression setting used in TROBIC, $P_L$ can be set to 15.

If the condition for local-index coding is satisfied, the algorithm proceeds to step 109 where the current block is local-index coded. Otherwise, the algorithm proceeds to step 110, where a third condition is evaluated to determine whether lossless coding is to be used. Lossless coding is used if:

$B \geq 64 \times 24$ and no block has yet been coded by the SBCW coding process.

If the test succeeds the the algorithm proceeds to step 111, where the current block is losslessly coded by simply appending all the R,G,B values in the current block to the coded bit-stream. Otherwise, the algorithm proceeds to step 112. The image block is converted in step 112 from R,G,B color space to $Y,C_b,C_r$ color space, which is more amenable to lossy coding using SBCW. Then, in step 113, the bit budget B is apportioned into budgets for Y, $C_b$, and $C_r$ components (typically in the ratio 4:1:1) and the Y, $C_b$, and $C_r$ component blocks are coded using the SBCW technique so that each of their budgets are met. After coding the block using any of the four possible techniques, the algorithm returns to step 102 for the next block.

In the global- and local-index coding schemes, let $b_p = \lceil \log_2 P \rceil$ and $b = \lceil \log_2 P_B \rceil$, where P is the palette size for the current block and $P_B$ is the largest palette size allowed (which is $P_G$ for global- and $P_L$ for local-index coding). If $b_p = b$, run length coding is not used—each pixel is coded using $b_p$ bits to indicate its index in the palette. Otherwise, $b_p < b$, and run length coding is used, while cleverly ensuring that the block budget is not exceeded. Run length coding works as follows: The current pixel's index in the palette is coded using $b_p$ bits. This is followed by a variable length code indicating the number of equivalued pixels immediately following, that is, the 'run'. The variable length code can be summarized as:

| code | run length | code bits | bit per pixel (bpp) |
|---|---|---|---|
| 0 | 0 | 1 | $b_p + 1$ |
| 10 | 1 | 2 | $(b_p + 2)/2$ |
| 11[x] | 2 + x | b + 1 | $(b_p + b + 1)/(3 + x)$ | where $0 \leq x \leq 2^{b-1}-1$, and [x] denotes the binary representation of x using b−1 bits.

Thus, it is guaranteed that the bpp, which is at most $$\frac{b_P + b + 1}{3 + x} \leq \frac{b_P + b + 1}{3},$$

is no more than b.

One approach in apportioning the number of bits per 32×2 block of pixels for global-index, local-index and lossless coding is to maintain the following relationship:

$$B = (nB_T/N) - B_{used} + B_T/N$$

where B is the budget for the last block, $B_T$ is the total number of bits for the image (which is the total the number of bits needed to represent the image ($B_{image}$) less the number of bits in the global palette ($B_{global\ palette\ size}$)), n is the number of blocks coded previously, and N is the total number of blocks used. $B_{used}$ is the total number of bits used in previous blocks.

Another possibility is to guarantee on every group of 2K rows, where K=1 typically, that only ($B_T$/# of row groups) bits are used for the group of rows.

With respect to SBCW, the coding process embodied therein is targeted for high-quality compression and is most efficient for high quality settings. It operates on 32×2 blocks of pixels and uses a combination of the 2-6 wavelet filter and the Haar filter for subband decomposition. The image blocks are transformed by these simple wavelet filters into subband coefficients. The coefficients are then bunched together into 11 different groups using a simple tree structure in which each level of the tree corresponds to a particular level of resolution. Each group is coded using the same number of bits per coefficient, and the number itself is efficiently determined so that the total number of bits used for a block is no more than a given budget.

An encoder first transforms the input block of pixels into a block of 64 subband coefficients by applying the 2-6 wavelet filter and the Haar filter. These coefficients are then fed into an entropy-coder, along with the bit budget, B', where the coded bit-stream is generated. A decoder then reverses the steps applied by the encoder by extracting the block of coefficients from the bit stream, and then subjecting each block to the inverse transformation of the SBCW-Transform by applying the filters to recover the pixel approximations. In addition to being a part of the TROBIC technique, SBCW coding can be used independently as an image compression technique in a variety of applications.

Whether used alone or as part of the block-based coding scheme of TROBIC, SBCW has several desirable properties. Since each block spans only two image rows, SBCW can be used in a compression-decompression system with minimal buffering overheads. TROBIC also has low computational complexity; the underlying transformation can be achieved with just shift, add and clip operations. In addition, TROBIC requires no look-up tables for codes and is more efficient from a rate-distortion point of view than complex zero-tree encoding schemes at the high target bit-rates. Finally, the coefficients are encoded using a novel entropy coding technique, with precise rate control.

DESIGN CHOICES

SBCW was designed for the TROBIC image compression technique, to be used for sending color images to printers. The target bit-rate was 8 bpp (i.e., 3:1 compression from 24 bpp). Minimal buffer size, low computation complexity, very high quality (no visible compression artifacts when printed) and guaranteed rate control were the key requirements. The following choices were made after experimenting with a wide variety of possibilities:

1. Blocks of width 32 and height 2: The height has to be small to allow small image buffers. The width was chosen after experimenting with the possibilities 8, 16, 32, and 64, as it offered the best complexity-quality tradeoff. A block-based coding scheme was desired so as to enable alternative coding techniques for some image blocks, as well as simplify the whole TROBIC system.

2. A combination of the 2-6 wavelet filter (reported in [1] Villasenor, J., Belzer, B., and Liao, J., Wavelet Filter Evaluation for Image Compression, *IEEE Transactions on Image Processing*, 2:1053–1060, August 1995) and the Haar filter, for subband decomposition: The 2-6 filter has some excellent properties for compression, while being computationally simple [1]. Most factors of $\sqrt{2}$ in the filter coefficients are automatically eliminated by multiple applications of the filters during the subband decomposition itself. The few remaining ones are eliminated by scaling. The resulting transformation can be achieved with just shift and add operations. Moreover, all computations in the encoder as well as the decoder can be done using 20-bit precision arithmetic (with some clipping in the decoder to ensure that overflow/underflow does not occur).

3. A simple, novel and efficient quantization and entropy-coding module with exact rate-control: This coding technique works by bunching together the subband coefficients into groups using the subband tree structure. Each group is coded using the same number of bits per coefficient, and this number itself is efficiently determined so that the total number of bits used for a block is no more than a given budget. This technique requires no look-up tables of codes, and turns out to be more efficient from a rate-distortion point of view than complex zero-tree encoding schemes like those in [4,3], at the target bit-rates.

THE ENCODER

A block diagram of an encoder 21, which forms part of SBCW, is shown in FIG. 2 along with the two encoder steps. The input 22 to the encoder 21 is a 32×2 block of pixel samples, each in the range [0,255]. Let these samples be represented by I(i,j), with $0 \leq i < 2$ and $0 \leq j < 32$. The encoder is also given a bit budget, B', and its task is code the block I with no more than B' bits.

The encoder 21 includes a transform 23 which first transforms the input block 22 into a block of 64 subband coefficients. These coefficients (C(n), $0 \leq n < 64$) are then fed into a quantizer and entropy-coder, collectively designated by reference numeral 24, along with the bit budget, B'.

The Subband Transformation

Two filters are used: the Haar filter and the 2-6 wavelet filter. The Haar filter has the low-pass filter coefficients, for both analysis and synthesis, as $$\left(\frac{1}{\sqrt{2}}, \frac{1}{\sqrt{2}}\right).$$

For the 2-6 filter, the analysis low-pass filter coefficients are $$\left(\frac{1}{\sqrt{2}}, \frac{1}{\sqrt{2}}\right),$$

while the synthesis low-pass filter coefficients are $$\left(-\frac{1}{8\sqrt{2}}, \frac{1}{8\sqrt{2}}, \frac{1}{\sqrt{2}}, \frac{1}{\sqrt{2}}, \frac{1}{8\sqrt{2}}, -\frac{1}{8\sqrt{2}}\right).$$

Let $F_1$ denote the Haar filter, and $F_2$ denote the 2-6 filter. The analysis filter implementations can be described in terms of mapping a sequence of inputs of length 2M, $(x_0, x_1, \ldots, x_{2M-1})$, to M low-pass coefficients, $(y_0, y_1, \ldots, y_{M-1})$, and M high pass coefficients, $(z_0, z_1, \ldots, z_{M-1})$, as illustrated in FIG. 3. For the Haar filter, $F_1$:

$y_i = x_{2i} + x_{2i+1}$, $i = 0, \ldots, M-1$, $z_i = x_{2i} - x_{2i+1}$, $i = 0, \ldots, M-1$.

And for the 2-6 filter, $F_2$:

$y_i = x_{2i} + x_{2i+1}$, $i = 0, \ldots, M-1$, $z_i = -(x_{2i-2} + x_{2i-1}) + 8(x_{2i} - x_{2i+1}) + (x_{2i+2} + x_{2i+3})$, $i = 0, \ldots, M-1$.

For the filter $F_2$, the input sequence is extended at both ends by setting $x_{-2} = x_1$, $x_{-1} = x_0$, $x_{2M} = x_{2M-1}$, and $x_{2M+1} = x_{2M-2}$. Note that the factors of $\sqrt{2}$ have been omitted from the computations, as they are folded together over a sequence of filtering steps into single scaling factors for each subband.

The subband transformation is achieved by applying the following filtering steps on the 32×2 block, I, of image samples. Denote the 64 resulting coefficients by C'(n), $0 \leq n < 64$. The following pseudo-code illustrates the procedure.

procedure SBCW-Transform input: Image block I output: Coefficient block C' begin

1. Apply $F_1$ vertically to each of the 32 columns of length 2.

2. Apply $F_2$ horizontally on both rows of length 32.

3. Apply $F_2$ horizontally on the low-pass coefficients (length 16) in the top row.

4. Apply $F_2$ horizontally on the low-pass coefficients (length 8) in the top row.

5. Apply $F_2$ horizontally on the low-pass coefficients (length 4) in the top row.

6. Apply $F_1$ horizontally on the low-pass coefficients (length 2) in the top row.

end

The subband structure of these coefficients is shown in FIG. 4. The number at the bottom of each box is the subband number that will be used to conveniently identify each subband. If the actual filters (with the $\sqrt{2}$ factors) had been applied, suppose the resulting coefficients would have been $C^*(n)$, $0 \leq n < 64$. It can be easily seen that the computed values, C'(n), are related to the $C^*(n)$ values as follows:

$C^*(n) = C'(n)/8$, n=0 (subband 0)

$C^*(n) = C'(n)/8$, n=1 (subband 1)

$C^*(n) = C'(n)/32\sqrt{2}$, n=2,3 (subband 2)

C*(n)=C'(n)/32, n=4, . . . , 7 (subband 3)
C*(n)=C'(n)/16√2, n=8, . . . , 15 (subband 4)
C*(n)=C'(n)/16, n=16, . . . , 31 (subband 5)
C*(n)=C'(n)/2, n=32, . . . , 47 (subband 6)
C*(n)=C'(n)/16, n=48, . . . , 63 (subband 7)

Notice that for almost all subbands, the C*(n) values are simply the C'(n) values divided by an integral power of 2. Let C(n) represent the coefficient values obtained by dividing each C'(n) by the corresponding integral power of 2. The coefficients in subband 2 are divided by 32, and those in subband 4 are divided by 16, omitting the factors of √2. Thus, $$C(n) = \begin{cases} \sqrt{2}\, C^*(n), & n = 2, 3 \text{ (subband 2), and,} \\ & n = 8, ..., 15 \text{ (subband 4),} \\ C^*(n), & \text{otherwise.} \end{cases}$$

The quantization and encoding step will try to give equal importance to a 1 in a particular bit position across all the $|C(n)|$ values (that is, a 1 in the third bit of $|C(0)|$ will be treated as importantly as a 1 in the third bit of $|C(63)|$). This is in accordance with the result ([2] DeVore, R. A., Jawerth, B., and Lucier, B. J. Image Compression Through Wavelet Transform Coding. *IEEE Trans. Inform. Theory*, 38(2):719–746, March 1992 and [3] Said, A. and Pearlman, W. A. A New, Fast, and Efficient Image Codec Based on Set Partitioning in Hierarchical Trees. *IEEE Trans. Circuits Syst. Video Technol.*, 6(3):243–250, June 1996) that from the perspective of reducing mean-squared error progressively, unitary transform coefficients with larger magnitudes should be encoded first. The transformation I→C is only approximately unitary, but tests have shown that the above strategy works very well while being simple to implement.

Quantization and Entropy-coding

The 64 subband coefficients can be seen to form a tree, with each level (other than 0, which just has the DC coefficient, C(0)) corresponding to the details at a particular resolution and each subtree corresponding roughly to a sub-block of the original image block. Coefficient C(0) is simply 8 times the mean pixel value in the image block I and is always coded exactly using 11 bits. This tree structure is shown in FIG. 5 (the coefficient C(n) is denoted in the figure by the number n at a tree node). In state-of-the-art wavelet coders ([4] Shapiro, J. M. Embedded Image Coding Using Zerotrees of Wavelet Coefficients. *IEEE Trans. Signal Processing*, 41(12):3445–3462, December 1993 and [3] Said, A. and Pearlman, W. A. A New, Fast, and Efficient Image Codec Based on Set Partitioning in Hierarchical Trees. *IEEE Trans. Circuits Syst. Video Technol.*, 6(3):243–250, June 1996), such a tree of wavelet coefficients is coded by first encoding the tree structure in terms of significance of the coefficients with respect to several thresholds. A coefficient is said to be significant with respect to a threshold if its magnitude is not less than the threshold. The thresholds are typically powers of two, and the tree structure is efficiently coded by using special symbols to identify frequently occurring cases such as a whole subtree of insignificant coefficients [4,3] and a significant coefficient at the root of an otherwise insignificant subtree [3]. Given an overall bit budget B', such an encoder will apportion B' into $B_z$ bits for encoding the tree structures for various thresholds, and $B_c$ bits for coding the actual coefficient bits. The tree structure, which is encoded using $B_z$ bits, can be seen as an efficient way of identifying the bit position of the most significant 1-valued bit in the absolute value of each coefficient that is significant with respect to the smallest threshold used. The remaining $B_c$ bits are used to transmit the remaining bits of each coefficient (to the right of the most significant 1 but not beyond the location of the least threshold) without any entropy-coding, as these bits are likely to be uniformly random.

While such a scheme works extremely well at low to moderately high bit rates, I have found that for the particular tree structure used in SBCW and the high target bit rates, a much simpler scheme performs even better. At high bit rates, even though the above scheme will still identify the position of the most significant 1 in each coefficient, it will spend too many bits doing so. That is, $B_z$ will be high. It is more efficient to spend fewer bits ($B_z$) to encode the significance maps, as the resulting savings will more than compensate for encoding some 0-valued bits to the left of the most significant 1 for some coefficients.

Entropy coder 21 does not use any zerotree symbols. Instead, it bunches together the coefficients (except coefficient 0) into 13 groups (as shown in FIG. 6), and use the greatest location of the most significant 1 within a group to determine the number of bits used for that group. The groups are further organized into three classes. Group $G_{cg}$ denotes group number g within class c. Table 1 summarizes this organization of coefficients into groups and groups into classes. For each group, the indices of member coefficients are listed.

TABLE 1

Coefficient group summary

| Group | Class c | Group's index in class g | Member coefficients |
|---|---|---|---|
| $G_{00}$ | 0 | 0 | 1,2,3 |
| $G_{10}$ | 1 | 0 | 4,8,9 |
| $G_{11}$ | 1 | 1 | 5,10,11 |
| $G_{12}$ | 1 | 2 | 6,12,13 |
| $G_{13}$ | 1 | 3 | 7,14,15 |
| $G_{20}$ | 2 | 0 | 16,17,32,33,48,49 |
| $G_{21}$ | 2 | 1 | 18, 19, 34, 35, 50, 51 |
| $G_{22}$ | 2 | 2 | 20, 21, 36, 37, 52, 53 |
| $G_{23}$ | 2 | 3 | 22, 23, 38, 39, 54, 55 |
| $G_{24}$ | 2 | 4 | 24, 25, 40, 41, 56, 57 |
| $G_{25}$ | 2 | 5 | 26, 27, 42, 43, 58, 59 |
| $G_{26}$ | 2 | 6 | 28, 29, 44, 45, 60, 61 |
| $G_{27}$ | 2 | 7 | 30, 31, 46, 47, 62, 63 |

The encoder 21 uses the bit budget B' to compute a value β, which is the number of right shifts it will apply to each of the 63 coefficients (i.e., all except the DC term). For any non-negative integer ν, let $\mu(\nu)$ denote the number of bits in ν to the right of and including the most significant 1 (note that $\mu(\nu) = \lceil \log_2(\nu+1) \rceil$, but can be implemented simply as a table look-up). For example, $\mu(0)=0$, $\mu(1)=1$, and $\mu(6)=3$. For a given value of β, let $$\gamma(n, \beta) = \begin{cases} \mu(|C(n)|) - \beta, & \mu(|C(n)|) \geq \beta \\ 0, & \mu(|C(n)|) < \beta. \end{cases}$$

For a coefficient group $G_{cg}$, let $\gamma_{cg}(\beta)$ denote the maximum value of $\gamma(n, \beta)$ over all members n in $G_{cg}$. The basic idea is to code each member coefficient C(n) in $G_{cg}$ using $\gamma_{cg}(\beta)$ bits for the value $(|C(n)|>>\beta)$, and if that value is non-zero, an additional bit for the sign.

The decoder needs to know the value of β and of each $\gamma_{cg}(\beta)$ in order to recover the coded coefficient values. The value of β need not be any more than 11 (which can be seen by tracking the dynamic ranges of values of the coefficients through the subband transformation). Thus, β can be coded using 4 bits. Let $\mu_{cg}$ denote the maximum value of $\mu(|C(n)|)$ over all the members n in $G_{cg}$. Then, $\gamma_{cg}(\beta)$ can be easily computed as the maximum of $\{0, \mu_{cg}-\beta\}$. Moreover, each $\mu_{cg}$ has an upper bound (which depends just on the class number, c) determined by the filter coefficients in SBCW-Transform and the range of pixel values, [0,255]. This places an upper bound on $\gamma_{cg}(\beta)$ for each value of $\beta$. That is, the value of $\beta$ determines a bit-precision $M_C(\beta)$ which is enough to code any value of $\gamma_{cg}(\beta)$. These values are tabulated in Table 2.

TABLE 2

Bits needed to code $\gamma_{cg}(\beta)$

| Class (c) | Shift amount ($\beta$) | Bits needed ($M_c(\beta)$) |
|---|---|---|
| 0 | 0,1,2,3 | 4 |
| 0 | 4,5,6,7 | 3 |
| 0 | 8,9 | 2 |
| 0 | 10 | 1 |
| 0 | 11 | 0 |
| 1 | 0,1,2 | 4 |
| 1 | 3,4,5,6 | 3 |
| 1 | 7,8 | 2 |
| 1 | 9 | 1 |
| 1 | 10,11 | 0 |
| 2 | 0,1 | 4 |
| 2 | 2,3,4,5 | 3 |
| 2 | 6,7 | 2 |
| 2 | 8 | 1 |
| 2 | 9,10,11 | 0 |

The shift by $\beta$ positions can be combined with the shift done to obtain C(n) from C'(n) Thus, there is no need to explicitly compute C(n) values, as the C'(n) values produced by the procedure SBCW-Transform can be directly used. Let r(s) represent the amount of shift needed for subband number s. Then, in the quantization step, the value C'(n) will be right shifted by $\beta+r(s)$ positions, where s is the subband number for coefficient n. The r(s) values are listed in Table 3. Before shifting, always add the value $2\beta^{+r(s)-1}$, for rounding.

TABLE 3

Shifts needed in each subband to obtain C(n) from C'(n)

| Subband number, s | Shift amount, r(s) |
|---|---|
| 0 | 3 |
| 1 | 3 |
| 2 | 5 |
| 3 | 5 |
| 4 | 4 |
| 5 | 4 |
| 6 | 1 |
| 7 | 4 |

The only remaining piece is the computation of the smallest value of $\beta$ such that the number of bits used will be no more than the given budget B'. For any value of $\beta$, the number of bits spent on the $\gamma_{cg}(\beta)$ values and the coefficient magnitudes themselves, are easily calculated, without going through the coding process itself. In addition, the number of coefficients for which a sign-bit will be needed, at a given value of $\beta$, is required. Let Z(b) denote the number of coefficients for which $\mu(|C'(n)|)-r(s) \leq b$ (this array is easily calculated during our first pass over the coefficients). Then, at a particular value $\beta$, $Z(\beta-1)$ coefficients will be zero (note that this excludes the coefficients for which $\mu(|C'(n)|)-r(s)=\beta$, as these coefficients will not be zero because of round-off).

Putting together all these ideas, the algorithm of the entire block encoder 21 is now presented in pseudo-code.

The Encoder Algorithm

In the following description, the procedure SendBits(v,x) denotes putting the x least significant bits from the binary representation of v in the output bit-stream. The symbol $g_c$ denotes the number of groups in class c ($g_0=1$, $g_1=4$, and $g_2=8$), and $n_c$ denotes the number of coefficients in a group in class c ($n_0=3$, $n_1=3$, and $n_2=6$).

```
procedure SBCW-Encode
inputs: Image block I, Bit budget B'
output: The coded bit-stream
begin
  /* Obtain the scaled transform coefficients, C'(n),
     0≤n<64. */
  C'=SBCW-Transform(I)
  /* Descale and code C'(0), whose subband number is s=0.
     */
  C'(0)+=2^{r(0)-1}; C'(0)>>=r(0)
  SendBits(C'(0), 11)
  /* Compute the group precisions (μ_{cg}) and Z(b). */
  Set each μ_{cg} and Z(b) to 0.
  for n=1 to 63
    /* Get absolute value and record sign. */
    if C'(n)<0 then C'(n)=-C'(n); Sign(n)=1
    else Sign(n)=0
    /* Compute bits needed. */
    (c,g,s)=class number, index-in-class, subband number
         for G_{cg},
    the group containing n
    b=μ(C'(n))-r(s)
    /* For β>b, C'(n) will be coded as zero. */
    Z(b)+=1
    /* Let h_{cg} record the number of coefficients in G_{cg} for
       which μ(C'(n))-r(s)=μ_{cg}. */
    if b>μ_{cg} then μ_{cg}=b; h_{cg}=1
    else if b==μ_{cg} then h_{cg}+=1
  /* Make Z(b) the number of coefficients that will be coded
     as 0 when β≤b. */
  for b=-4 to 11
    Z(b)+=Z(b-1)
  /* Compute β such that the budget B' is not exceeded */
  β=0
  while β<11
    /* Initialize B", the number of bits used with this value
       of β */
    /* 11 for C'(0), 4 for β, 63-Z(β-1) for sign-bits */
    B"=78-Z(β-1)
    for c=0 to 2
      /* Add the bits needed for sending the γ_{cg} values */
      B"+=(g_c M_c(β))
      for g=0 to g_c-1
        γ_{cg}(β)=μ_{cg}-β
        if γ_{cg}(β)<0 then γ_{cg}(β)=0
        else if γ_{cg}(β)==0 then B"-=h_{cg}
        /* h_{cg} coefficients were not counted in Z(β-1)
           because of round-off, but there is no round-off
           when γ_{cg}(β) is 0.
           */
        B"+=(n_c γ_{cg}(β))
    if B"≤B' then break
    β+=1
  /* Out of the while-loop now, with a value β such that
     budget B' is met. */
  /* Code the value of β */
  SendBits(β, 4)
```

```
/* Code the values of γ_cg(β) */
for c=0 to 2
    for g=0 to g_c-1
        SendBits(γ_cg(b), M_C(β))
/* Code the coefficients */
for n=1 to 63
    (c,g,s)=the numbers of class, group, subband for n.
    if γ_cg(β)>0 then
        /* Descale and quantize with round-off */
        C'(n)+=2β^{+r(s)-1}; C'(n)>>=(β+r(s))
        /* Make sure that the round-off does not increase bits
           needed */
        if C'(n)==_2γ_cg(β) then C'(n)-=1
        SendBits(C'(n), g_cg(β))
        if C'(n)≠0 then SendBits(Sign(n), 1)
end
```

THE DECODER

The decoder 31 of SBCW, shown in FIG. 7, reverses the steps applied by the encoder 21. The block of coefficients is extracted from the bit stream and input into a dequantizer and entropy-decoder 32. Because of quantization, these coefficients will be slightly different from the C(n) values, and are denoted by $\hat{C}(n)$, $0 \leq n < 64$. The block $\hat{C}$ is then sent through the inverse transformation of SBCW-Transform 33, to recover the pixel approximations, $\hat{I}(i,j)$, $0 \leq i < 2$, and $0 \leq j < 32$, designated by reference numeral 34. In the following pseudo-code, the procedure GetBits(x) denotes extraction of x bits from the bit-stream, and returning them in the least significant positions of an integer.

```
procedure SBCW-Decode
    input: coded bit-stream
    output: image block Î
begin
    /* Extract Ĉ(0). */
    Ĉ(0)=GetBits(11)
    /* Extract β. */
    β=GetBits(4)
    /* Extract the values of γ_cg(β) */
    for c=0 to 2
        for g=0 to g_c-1
            γ_cg(β)=GetBits(M_C(β))
    /* Extract the coefficients. */
    for n=1 to 63
        (c,g)=the numbers of class, group for n.
        if γ_cg(β)>0 then
            Ĉ(n)=GetBits(γ_cg(β))
            Ĉ(n)<<=β
            if Ĉ(n)≠0 then if GetBits(1)==1 then Ĉ(n)=-Ĉ(n)
            else Ĉ(n)=0
    /* Extract the pixel values. */
    Î=SBCW-InverseTransform(Ĉ)
end
```

The inverse transform procedure, SBCW-InverseTransform, can be described using two kinds of synthesis filters, one for the Haar filter ($F_1^{-1}$), and one for the 2-6 filter ($F_2^{-1}$). The implementation of these synthesis filters can be described in terms of mapping a sequence of inputs of length 2M to a sequence of outputs of length 2M. The input sequence consists of M low-pass coefficients, ($y_0$, $y_1$, ..., $y_{M-1}$), and M high pass coefficients, ($z_0$, $z_1$, ..., $z_{M-1}$). The output sequence consists of the reconstructed values, ($x_0$, $x_1$, ..., $x_{2M-1}$). For the Haar filter, $F_1^{-1}$:

$$x_{2i} = y_i + z_i,$$

i=0, ..., M−1, $$x_{2i+1} = y_i - z_i,$$

i=0, ..., M−1.

And for the 2-6 filter, $F_2^{-1}$:

$$x_{2i} = y_{i-1} - y_{i+1} + 8(y_i + z_i),$$

i=0, ..., M−1, $$x_{2i+1} = -(y_{i-1} - y_{i+1}) + 8(y_i - z_i),$$

i=0, ..., M−1.

For the filter $F_2^{-1}$, the sequence ($y_0$, $y_1$, ..., $y_{M-1}$) is extended at both ends by setting $y_{-1}=y_0$, and $y_M=y_{M-1}$.

The inverse transformation uses the synthesis filters $F_1^{-1}$ and $F_2^{-1}$, and several scaling steps to recover the pixel block, $\hat{I}$. In the pseudo-code given below, the notation, LShift(A,s,e,d), is used to mean, "left shift each A(i) by d, for $s \leq i \leq e$." And the notation, Descale(A,s,e,d), means, "for $s \leq i \leq e$, add $2^{d-1}$ to A(i) and right-shift by d."

```
procedure SBCW-InverseTransform
    input: coefficient block, Ĉ
    output: image block Î
begin
```

1. $(\hat{C}(0), \hat{C}(1)) \xrightarrow{F_1^{-1}} (\hat{C}_1(0), \hat{C}_1(1))$.

2. $(\hat{C}_1(0), \hat{C}_1(1), \hat{C}(2), \hat{C}(3)) \xrightarrow{F_2^{-1}} (\hat{C}_2(0), ..., \hat{C}_2(3))$.

3. $(\hat{C}_2(0), ..., \hat{C}_2(3), \hat{C}(4)<<4, ..., \hat{C}(7)<<4) \xrightarrow{F_2^{-1}} (\hat{C}_3(0), ..., \hat{C}_3(7))$.

4. $(\hat{C}_3(0), ..., \hat{C}_3(7), \hat{C}(8)<<7, ..., \hat{C}(15)<<7) \xrightarrow{F_2^{-1}} (\hat{C}_4(0), ..., \hat{C}_4(15))$.

5. $(\hat{C}_4(0), ..., \hat{C}_4(15), \hat{C}(16)<<11, ..., \hat{C}(31)<<11) \xrightarrow{F_2^{-1}} (\hat{C}_5(0), ..., \hat{C}_5(31))$.

$(\hat{C}(32), ..., \hat{C}(47), \hat{C}(48), ..., \hat{C}(63)) \xrightarrow{F_2^{-1}} (\hat{C}_5(32), ..., \hat{C}_5(63))$.

LShift($\hat{C}_5$, 32, 63, 11)

-continued

6. Apply $F_1^{-1}$ vertically on each column to get $(\hat{C}_6(0), ..., \hat{C}_6(63))$.

7. Descale$(\hat{C}_6, 32, 63, 15)$.

8. Each $\hat{I}(i, j)$ is now in $\hat{C}_6(32i + j)$. Clamp each $\hat{I}(i, j)$ in the range [0, 255].

end

The decoder arithmetic can be carried out exactly using 32-bit arithmetic, without any overflow/underflow. For hardware implementation of the decoder 31, it might be useful to use fewer than 32 bits. By restricting the range of the intermediate values in procedure SBCW-InverseTransform to limits computed by comparing the possible range of corresponding values through the forward transform, it can be seen that the inverse transform can be computed without any loss of accuracy using 24-bit arithmetic. This is described in the following procedure, which uses the notation, Clamp(A,s,e,L,H), to mean, "clamp each A(i) in the range [L,H], for s≤i≤e."

procedure SBCW-24BitInverseTransform
input: coefficient block, $\hat{C}$
output: image block $\hat{I}$
begin end The required bit-precision can be reduced even further, down to 20-bit arithmetic. This is done by descaling using right-shifts between some intermediate steps. The intermediate results, $(\hat{C}_2(0), \ldots, \hat{C}_2(3))$, would have been multiples of 4 if the coefficients had not been quantized. Hence, these are natural candidates for scaling down by right-shifting by 2. Then, in step 3, the left-shift on the high-pass coefficients need only be by 2 instead of 4. In step 4, the left-shift need only be by 5 instead of 7. Moreover, the resulting $(\hat{C}_4(0), \ldots, \hat{C}_4(15))$ would have been multiples of 256, if unquantized coefficients had been used. Hence this is another natural place for scaling down, which is done by right-shifting by 3, which turns out to be enough to allow 20-bit arithmetic everywhere. The resulting loss of accuracy is negligible (in terms of PSNR, the loss is about 0.005 dB). The 20-bit implementation of the inverse transform is completely described in the following procedure.

procedure SBCW-20BitInverseTransform
input: coefficient block, $\hat{C}$
output: image block $\hat{I}$
begin 1. $(\hat{C}(0), \hat{C}(1)) \ (\hat{C}_1(0), \hat{C}_1(1))$.

Clamp$(\hat{C}_1, 0, 1, 0, 2040)$.

2. $(\hat{C}_1(0), \hat{C}_1(1), \hat{C}(2), \hat{C}(3)) \xrightarrow{F_2^{-1}} (\hat{C}_2(0), ..., \hat{C}_2(3))$.

Clamp$(\hat{C}_2, 0, 3, 0, 16320)$.

3. $(\hat{C}_2(0), ..., \hat{C}_2(3), \hat{C}(4) \!<\!< 4, ..., \hat{C}(7) \!<\!< 4) \ (\hat{C}_3(0), ..., \hat{C}_3(7))$.

Clamp$(\hat{C}_3, 0, 7, 0, 130560)$.

4. $(\hat{C}_3(0), ..., \hat{C}_3(7), \hat{C}(8) \!<\!< 7, ..., \hat{C}(15) \!<\!< 7) \xrightarrow{F_2^{-1}} (\hat{C}_4(0), ..., \hat{C}_4(15))$.

Clamp$(\hat{C}_4, 0, 15, 0, 1044480)$.

5. $(\hat{C}_4(0), ..., \hat{C}_4(15), \hat{C}(16) \!<\!< 11, ..., \hat{C}(31) \!<\!< 11) \xrightarrow{F_2^{-1}} (\hat{C}_5(0), ..., \hat{C}_5(31))$.

Clamp$(\hat{C}_5, 0, 31, 0, 8355840)$.

$(\hat{C}(32), ..., \hat{C}(47), \hat{C}(48), ..., \hat{C}(63)) \xrightarrow{F_2^{-1}} (\hat{C}_5(32), ..., \hat{C}_5(63))$.

Clamp$(\hat{C}_5, 32, 63, -2040, 2040)$.

LShift$(\hat{C}_5, 32, 63, 11)$

6. Apply vertically on each column to get $(\hat{C}_6(0), ..., \hat{C}_6(63))$.

7. Descale$(\hat{C}_6, 0, 63, 15)$.

8. Each $\hat{I}(i, j)$ is now in $\hat{C}_6(32i + j)$. Clamp each $\hat{I}(i, j)$ in the range [0, 255].

1. $(\hat{C}(0), \hat{C}(1)) \xrightarrow{F_1^{-1}} (\hat{C}_1(0), \hat{C}_1(1))$.

Clamp$(\hat{C}_1, 0, 1, 0, 2040)$.

2. $(\hat{C}_1(0), \hat{C}_1(1), \hat{C}(2), \hat{C}(3)) \xrightarrow{F_2^{-1}} (\hat{C}_2(0), ..., \hat{C}_2(3))$.

Clamp$(\hat{C}_2, 0, 3, 0, 16320)$.

Descale$(\hat{C}_2, 0, 3, 2)$.

3. $(\hat{C}_2(0), ..., \hat{C}_2(3), \hat{C}(4)<<2, ..., \hat{C}(7)<<2)(\hat{C}_3(0), ..., \hat{C}_3(7))$.

Clamp$(\hat{C}_3, 0, 7, 0, 32640)$.

4. $(\hat{C}_3(0), ..., \hat{C}_3(7), \hat{C}(8)<<5, ..., \hat{C}(15)<<5)(\hat{C}_4(0), ..., \hat{C}_4(15))$.

Clamp$(\hat{C}_4, 0, 15, 0, 261120)$.

Descale$(\hat{C}_4, 0, 15, 3)$.

5. $(\hat{C}_4(0), ..., \hat{C}_4(15), \hat{C}(16)<<6, ..., \hat{C}(31)<<6)(\hat{C}_5(0), ..., \hat{C}_5(31))$.

Clamp$(\hat{C}_5, 0, 31, 0, 261120)$.

$(\hat{C}(32), ..., \hat{C}(47), \hat{C}(48), ..., \hat{C}(63))(\hat{C}_5(32), ..., \hat{C}_5(63))$.

Clamp$(\hat{C}_5, 32, 63, -2040, 2040)$.

LShift$(\hat{C}_5, 32, 63, 6)$

6. Apply $F_1^{-1}$ vertically on each column to get $(\hat{C}_6(0), ..., \hat{C}_6(63))$.

7. Descale$(\hat{C}_6, 0, 63, 10)$.

8. Each $\hat{I}(i, j)$ is now in $\hat{C}_6(32i + j)$. Clamp each $\hat{I}(i, j)$ in the range $[0, 255]$.

end

A coding/decoding system for TROBIC is depicted in block diagram form in FIG. 8. An uncompressed input image 41 consisting of pixel data is operated on by an encoder 42 which includes a coder 43–46 for each of the four coding techniques: global-index coding, local-index coding, lossless coding and SBCW coding. The encoder 41 breaks the image 41 into 32×2 blocks and applies the algorithm as previously described with reference to FIG. 1 to generate compressed image data in the form of a compressed bit stream which may be stored and/or transmitted as indicated in element 47. To decompress the compressed image data, a decoder 48 extracts the image blocks from the compressed image data and recovers the pixel approximations using the appropriate decoder 49–52 as previously described to generate the uncompressed output image 53.

FIG. 9 is a block diagram of a computer system incorporating the encoder 42 and decoder 48 of TROBIC. The computer system, which is identified generally by reference numeral 200, may be of any suitable type and represents an environment in which the invention may be practiced. By way of example, computer system 200 may be a main frame or personal computer, the latter of which may be of the IBM® compatible or Macintosh® type. Although the description may refer to terms commonly used in connection with particular computer systems, the description and concepts equally apply to other systems, including systems having different architectures from that shown in FIG. 9.

Computer system 200 comprises a central processing unit (CPU) 201 which may be a conventional microprocessor, a random access memory (RAM) 202 for temporary storage of information, and a read only memory (ROM) 203 for permanent storage of information. Each of these components is coupled to a bus 204. Operation of the computer system 200 is typically controlled and coordinated by operating system software. The operating system, which is embodied in the system memory and runs on CPU 201, coordinates the operation of the other components of computer system 200 by controlling allocation of system resources and performing a variety of tasks, such as processing, memory management, networking and I/O functions, among others.

Also coupled to bus 204 by a controller 205 is a diskette drive 206 into which a non-volatile mass storage device such as a diskette 207 may be inserted. Similarly, a controller 208 interfaces between bus 204 and a compact disc (CD) ROM drive 209 which is adapted to receive a CD ROM 210. A hard disk 211 is provided as part of a fixed disk drive 212 which is coupled to bus 204 by a disk controller 213.

Software for TROBIC may be stored on storage devices 207 and 210 and transferred to CPU 201 for execution. Alternatively, such software may be stored in RAM 202 or ROM 203. Similarly, image data generated in accordance with the invention may be loaded into and extracted from computer system 200 using removable storage media devices such as the diskette 207 and CD ROM 210. Alternatively, such data could be simply be stored by CPU 201 or in ROM 203.

Image data may also be input into computer system 200 by way of a variety of image sources, which are coupled to bus 204. Such image sources may include, for example, scanner 214 and digital camera 215. A keyboard 216 and mouse 217, which are coupled to bus 204 via a controller 218, facilitate the input of such data and otherwise provide a means for entering information into computer system 200.

Image data and computer software may also be transferred between computer system 200 and remote locations. To this end, computer system 200 may also include a communications adapter 219 which enables the system 200 to communicate with networks 220, which may include local area networks (LANs), the internet or online services, via direct connections or via modem. Communications adapter 219 may also be used to enable the system 200 to communicate with an external system 221 such as a global positioning system (GPS) via an appropriate transmission link.

In operation, the CPU 201 of computer system 200 may receive uncompressed hybrid color image data from storage device 207 or 210, or from a network 220 or external system 221. As the data is being received, CPU 201 may execute TROBIC to compress the data for transmission and/or storage. As previously noted, TROBIC is particularly useful for efficiently transmitting such image data from a computer to a printer for printing. Thus, compressed hybrid color image data may be transmitted from CPU 201 to printer 222 where the image data is decompressed using TROBIC and printed. If hybrid color image data that has already been compressed using TROBIC is received by CPU 201, such data may be decompressed by CPU 201 using TROBIC for viewing on display 223.

The invention having been described with reference to block and flow diagrams, it should be noted that these diagrams illustrate the performance of certain specified functions and relationships thereof The boundaries of these functional blocks have been arbitrarily defined herein for the convenience of description. Alternate boundaries may be defined so long as the specified functions and relationships thereof are appropriately formed. Moreover, the flow diagram and pseudo-code do not depict syntax or any particular programming language. Rather, they illustrate the functional information one skilled in the art would require to fabricate circuits or to generate computer software to perform the processing required. Each of the functions depicted in the block and flow diagrams may be implemented, for example, by computer software instructions, a functionally equivalent circuit such as a digital signal processor circuit, an application specific integrated circuit (ASIC) or combination thereof.

As the foregoing description demonstrates, the TROBIC technique of the present invention has low computational complexity and employs only two rows of buffer on both the compression and decompression side to produce high quality hybrid images with no visible compression artifacts at a guaranteed image compression rate. While the invention has been described in conjunction with specific embodiments, it will be evident to those skilled in the art in light of the foregoing description that many further alternatives, modifications and variations are possible. For example, although the target bit rate is 8 bpp (from 24 bpp) to yield a compression ratio of 3:1, the technique can be used for any rate of compression. Accordingly, the invention described herein is intended to embrace all such alternatives, modifications, applications and variations as may fall within the spirit and scope of the appended claims.

What is claimed is:

1. A method of compressing a digitized image, having a plurality of types of image data, using one or more of a plurality of coding techniques including global-index coding, local-index coding, lossless coding and wavelet coding, said method comprising the steps of:

segmenting the image into a plurality of image blocks;

computing, for a current image block, the number of colors that would have to be added to a global-index palette so that it would contain all colors in that image block, the number of colors in that image block, and the bit budget for that image block to determine whether a first condition is satisfied;

coding the current image block using global-index coding, if the first condition is satisfied;

computing a current and a maximum size of a local-index palette to determine whether a second condition is satisfied, if the first condition is not satisfied;

coding the current image block using local-index coding, if the first condition is not satisfied and the second condition is satisfied;

comparing the bit budget for the current image block with a predetermined size and determining whether any image block has yet been coded using wavelet coding to determine whether a third condition is satisfied, if neither of the first and second conditions is satisfied;

coding the current image block using lossless coding, if neither of the first and second conditions is satisfied and the third condition is satisfied; and coding the current image block using wavelet coding, if none of the first, second and third conditions is satisfied.

2. The method of claim 1, wherein the plurality of types of image data comprises text, graphics, synthetic image data and natural image data.

3. The method of claim 1, wherein each segmented image block is comprised of a plurality of pixels, each pixel for which one of global- and local-index coding is selected having an index in the global-index palette or the local-index palette, wherein the pixel index is coded by a run length code followed by a variable length code indicating the number of equivalued pixels immediately following that pixel to guarantee that a bit budget for the digitized image is met.

4. An encoder/decoder system for compressing and decompressing a digitized image, having a plurality of types of image data, comprising:

an encoder comprising a global-index coder, a local-index coder, a lossless coder and a wavelet coder; and a decoder comprising a global-index decoder, a local-index decoder, a lossless decoder and a wavelet decoder;

wherein the encoder segments the image into a plurality of image blocks, computes, for a current image block, the number of colors that would have to be added to a global-index palette so that it would contain all colors in that image block, the number of colors in that image block, and the bit budget for that image block to determine whether a first condition is satisfied, codes the current image block using the global-index coder, if the first condition is satisfied, computes a current and a maximum size of a local-index palette to determine whether a second condition is satisfied, if the first condition is not satisfied, codes the current image block using the local-index coder, if the first condition is not satisfied and the second condition is satisfied, compares the bit budget for the current image block with a predetermined size and determines whether any image block has yet been coded using the wavelet coder to determine whether a third condition is satisfied, if neither of the first and second conditions is satisfied, codes the current image block using the lossless coder, if neither of the first and second conditions is satisfied and the third condition is satisfied, and codes the current image block using the wavelet coder, if none of the first, second and third conditions is satisfied.

5. An encoder for compressing a digitized image, comprising:
- a unit for segmenting the digitized image into a plurality of image blocks;
- a global-index coder;
- a local-index coder;
- a lossless coder; and
- a wavelet coder;

wherein the encoder
- computes, for a current image block, the number of colors that would have to be added to a global-index palette so that it would contain all colors in that image block, the number of colors in that image block, and the bit budget for that image block to determine whether a first condition is satisfied,
- codes the current image block using the global-index coder, if the first condition is satisfied,
- computes a current and a maximum size of a local-index palette to determine whether a second condition is satisfied, if the first condition is not satisfied,
- codes the current image block using the local-index coder, if the first condition is not satisfied and the second condition is satisfied,
- compares the bit budget for the current image block with a predetermined size and determines whether any image block has yet been coded using the wavelet coder to determine whether a third condition is satisfied, if neither of the first and second conditions is satisfied,
- codes the current image block using the lossless coder, if neither of the first and second conditions is satisfied and the third condition is satisfied, and
- codes the current image block using the wavelet coder, if none of the first, second and third conditions is satisfied.

6. A decoder for decompressing a bit-stream representing a compressed digitized image, having a plurality of types of image data, comprising:
- a unit for extracting a plurality of image blocks from the bit stream;
- a global-index decoder;
- a local-index decoder;
- a lossless decoder; and
- a wavelet decoder;

wherein the decoder
- determines, for a current image block, which of global-index coding, local-index coding, lossless coding or wavelet coding was used to code that image block, and
- decodes the current image block using the global-index decoder, if the current image block was coded using global-index coding,
- decodes the current image block using the local-index decoder, if the current image block was coded using local-index coding,
- decodes the current image block using the lossless decoder, if the current image block was coded using lossless coding,
- decodes the current image block using the wavelet decoder, if the current image block was coded using wavelet coding.

7. An article of manufacture emboding a program of instructions executable by a device for performing a method of compressing a digitized image, having a plurality of types of image data, using one or more of a plurality of coding techniques including global-index coding, local-index coding, lossless coding and wavelet coding, said program of instructions comprising instructions for:
- segmenting the image into a plurality of image blocks;
- computing, for a current image block, the number of colors that would have to be added to a global-index palette so that it would contain all colors in that image block, the number of colors in that image block, and the bit budget for that image block to determine whether a first condition is satisfied;
- coding the current image block using global-index coding, if the first condition is satisfied;
- computing a current and a maximum size of a local-index palette to determine whether a second condition is satisfied, if the first condition is not satisfied;
- coding the current image block using local-index coding, if the first condition is not satisfied and the second condition is satisfied;
- comparing the bit budget for the current image block with a predetermined size and determining whether any image block has yet been coded using wavelet coding to determine whether a third condition is satisfied, if neither of the first and second conditions is satisfied;
- coding the current image block using lossless coding, if neither of the first and second conditions is satisfied and the third condition is satisfied; and
- coding the current image block using wavelet coding, if non of the first, second and third conditions is satisfied.

8. The article of manufacture of claim 7, wherein the plurality of types of image data comprises text, graphics, synthetic image data and natural image data.

9. The article of manufacture of claim 7, wherein each segmented image block is comprised of a plurality of pixels, each pixel for which one of global- and local-index coding is selected having an index in the global-index palette or the local-index palette, wherein the pixel index is coded by a run length code followed by a variable length code indicating the number of equivalued pixels immediately following that pixel to guarantee that a bit budget for the digitized image is met.

* * * * *

UNITED STATES PATENT AND TRADEMARK OFFICE
CERTIFICATE OF CORRECTION

PATENT NO. : 6,256,415 B1
DATED : July 3, 2001
INVENTOR(S) : Viresh Ratnakar

It is certified that error appears in the above-identified patent and that said Letters Patent is hereby corrected as shown below:

Column 22, claim 7,
Line 10, change "emboding" to -- embodying --.
Line 41, change "non" to -- none --.

Signed and Sealed this

Ninth Day of April, 2002

JAMES E. ROGAN
Director of the United States Patent and Trademark Office

Attest:

*Attesting Officer*